United States Patent [19]

Ahrweiler

[11] 4,371,414
[45] Feb. 1, 1983

[54] CONTROL SYSTEM FOR A CONTINUOUSLY OPERATING PRESS

[75] Inventor: Karl-Heinz Ahrweiler, Krefeld, Fed. Rep. of Germany

[73] Assignee: Eduard Küsters, Krefeld, Fed. Rep. of Germany

[21] Appl. No.: 332,182

[22] Filed: Dec. 18, 1981

Related U.S. Application Data

[63] Continuation of Ser. No. 912,983, Jun. 6, 1978, abandoned.

[30] Foreign Application Priority Data

Jun. 7, 1977 [DE] Fed. Rep. of Germany ....... 2725640

[51] Int. Cl.³ .............................................. B30B 5/06
[52] U.S. Cl. ................................ 156/361; 100/93 RP; 100/151; 156/555; 156/580; 425/372
[58] Field of Search ............... 156/359, 361, 378, 555, 156/580, 582, 583.5; 100/93 RP, 151, 154; 425/371, 372

[56] References Cited

U.S. PATENT DOCUMENTS

| | | | |
|---|---|---|---|
| 2,167,356 | 7/1939 | George | 156/580 |
| 2,326,889 | 8/1943 | Schulz et al. | 425/372 |
| 3,378,430 | 4/1968 | Aizawa | 100/93 RP |
| 3,851,685 | 12/1974 | Ahrweiler | 156/583.5 |
| 3,977,929 | 8/1976 | Evans | 156/378 |
| 3,993,426 | 11/1976 | Ahrweiler | 156/583.5 |
| 4,178,144 | 12/1976 | Tabler | 425/372 |
| 4,266,924 | 5/1981 | Fram | 425/372 |

Primary Examiner—Michael G. Wityshyn
Attorney, Agent, or Firm—Kenyon & Kenyon

[57] ABSTRACT

A control system for a continuously operating press, for the manufacture of chipboard, molded laminated plastic and the like, having two endless revolving forming belts which advance opposite each other in a pressing section, between which a starting material is compressed in the pressing section and each of which belts is provided with a separate drive, one of the drives being a lead drive equipped with a speed control for holding the belt velocity constant, in which there is provided a torque controller for comparing the torque of the lead drive with the torque of the other drive and providing an output which regulates the torque of the other drive such that the torques of the two drives always retain an adjustable ratio between each other over the entire torque range; and a further speed control for the belt drive which is not operating as the lead drive which is set higher than the speed control of the lead drive and which is adapted to be adjusted along with the speed control of the lead drive, with the speed ratio remaining the same.

3 Claims, 3 Drawing Figures

CONTROL SYSTEM FOR A CONTINUOUSLY OPERATING PRESS

This is a continuation of application Ser. No. 912,983 filed June 6, 1978, now abandoned.

BACKGROUND OF THE INVENTION

This invention relates to continuous presses in general and more particularly to a control system for a continuously operating press.

Control systems for continuously operating presses with two endless revolving forming belts which extend in a pressing section opposite each other, between which a starting material is compressed in a pressing section, and each of which is equipped with a separate drive, one of the drives being provided with a speed control to keep the belt velocity constant, are known. For example, the disclosure of German Auslegeschrift No. 22 31 802 relates to the control of a press of this type. However, in the disclosed design, so-called press belts, which exert the pressure on the forming belts, are provided in addition to the forming belts.

In machines of the type in question, it is essential that, in the cake of chips wetted with a setting resin glue, which is transported on the forming belts, no upsets or tearing occur, since this would loosen the incipient bonds in the mass of chips again and result in a sheet of lower quality. However, a continuous press of the type under discussion performs a different amount of work, depending on variations in the weight per unit area. This fluctuating amount of work must be supplied via the press belts which accordingly must take up different forces. This results in varying elastic deformations and slippage, which manifest themselves as upsets and tearing in cakes. It is an object of the German Auslegeschrift No. 22 31 802 to further develop a facility of the type described in such a manner that the cake will no longer suffer damage by tearing, crack formation or upsets when being carried through the continuously operating press by the transport belt. The idea of the solution disclosed in German Auslegeschrift No. 22 31 802 is to separate the torque demand of the continuously operating press from the torque demand of the forming belt conducted through the press. Only the transport power which is present with the press open is to be transmitted via the forming belt.

With the present invention, on the other hand, the entire driving power is transmitted to the forming belts, which are driven by suitable drives coupled to deflection rolls. If the drives operate differently, one drive can easily take up the predominant power and, so to speak, drags the other drive along. The power required therefor is transmitted through the setting cake which is contained between the forming belts and is thereby subjected to shear stresses which can be the cause of excessive loosening or the cause of failure to form the bonds in the mass.

SUMMARY OF THE INVENTION

It is an object of the present invention to develop a control of the type mentioned at the outset in such a manner that the two forming belts advance in synchronism in the pressing section without shear forces being transmitted through the cake.

According to the present invention, the solution of this problem comprises providing a torque controller which compares the torque of the drive equipped with the speed control, and operating as the lead drive, with the torque of the other drive and regulates it so that the torques always retain, between each other, an adjustable ratio over the entire torque range, and by associating with the belt drive which does not operate as the lead drive, a speed control which is set adjustably higher than the speed control of the lead drive and which can be adjusted together with the speed control of the lead drive, keeping the speed ratio constant.

The torques can be regulated so that they are equal within about ±10%.

The speed control of the drive not operating as the lead drive can be set 1 to 10% higher than the speed control of the other drive.

The reason why the torque controller should be able to set the torques of the two drives to different values is that the two forming belts can be subjected to different resistances in their advance during their endless revolution, depending on the design of the machine. For instance, the lower forming belt may have additional stations in the form of charging devices, cutting devices, unloading devices and the like. This results in a design-related different power demand for the two forming belts, which can be compensated by the torque controller in such a manner that the same amounts of power are available for the portion allotted to the pressing section, so that there is no need to transmit forces acting parallel to the forming belts through the bulk of the chips.

The speed control of the belt drive which is not operating as the lead drive functions only when the press is idling, inasmuch as it holds the speed of this belt drive at a value above the lead drive in this condition; the difference, however, should naturally be made as small as possible.

When the chip cake gets into the press, the power and thereby, the torque requirement increases. Since the speed control of the belt drive not operating as the lead drive is set to a higher value, this speed control would normally have the tendency to supply more power to the corresponding belt drive. However, since the forming belts must advance with the same velocity in the pressing section, this would lead to a situation where, eventually, almost the entire drive power would be supplied by the belt drive which does not operate as the lead drive, and the other belt drive would be pulled along. The force required for pulling the other belt drive along would be transmitted from the one forming belt to the other through the product.

During such operation, however, the torque controller comes into action. It keeps the torques of the two belt drives always, i.e., under all conditions, at the settable ratio. The speed control of the belt drive not operating as the lead drive can therefore not let more power go to this belt drive than the torque controller permits. In this manner the drive power cannot go predominantly to the belt drive not operating as the lead drive.

It is essential for proper functioning that the speed control of the belt drive not operating as the lead drive be set higher than the speed control of the lead drive by a finite amount. If the former speed control were set to the same or a lower value, then torque control could no longer be performed. For a lower value, the actual value of the speed of the belt drive not operating as the lead drive would be higher than the set-point value, with the press loaded, i.e., if the forming belts advance at the same velocity (assuming equal cylinder diameters), so that the speed control would take away power and the drive power would go to the lead drive. If the speed controls are set approximately equal, considerable variations of the power distribution result. A certain amount in excess of the set speed is therefore necessary, so that it is insured with certainty that the actual value does not reach the set-point value.

DETAILED DESCRIPTION OF THE INVENTION

Figure 1:
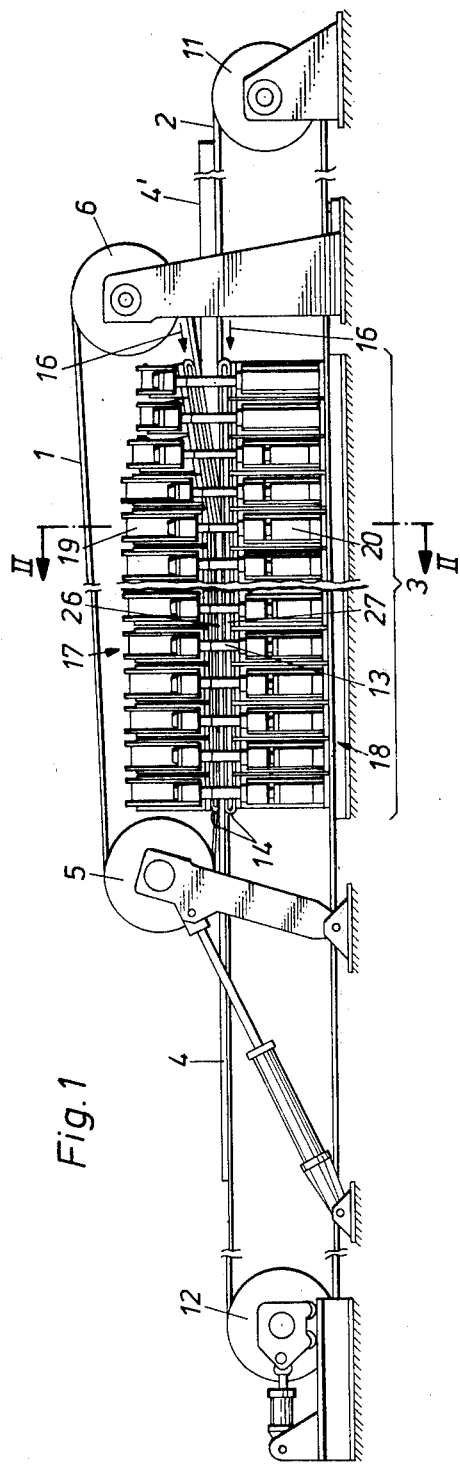
FIG. 1 is a diagrammatical side view of a press with the control system according to the present invention.

According to FIG. 1, an upper forming belt 1 revolves over rolls or cylinders 5 and 6 arranged transversely to a web or cake 4, and the lower forming belt 2 over cylinders 11 and 12. The forming belts 1 and 2 are driven by the cylinders.

The forming belts 1 and 2 run through the machine in the direction indicated by the arrows 16, so that a bed of chips 4' applied on the right-hand side in FIG. 1 by means not shown is drawn into the pressing section 3. The outgoing, compressed web or cake 4 is taken off in the left-hand region in FIG. 1 of the forming belt 2 by suitable devices, not shown. In the pressing zone 3, an upper support structure 17 is provided in the interior of the forming belt 1, which cooperates with a lower support structure 18 provided in the interior of the lower forming belt 2; they brace the areas of the forming belts 1 and 2 facing the web 4 against the latter and press upon them with great force over the area.

The support structures 17 and 18 consist of individual girders (or trusses) 19 and 20 which are arranged opposite each other above and below the forming belts 1 and 2 and the web 4. Each pair of trusses 19 and 20 is clamped together laterally outside the web by spindles 13, so that individual pressure members are formed which are closed in themselves as far as forces are concerned. Between the trusses 19 and the forming belt 1 there is a pressure plate 26 and between the forming belt 2 and the trusses 20 a pressure plate 27. The pressure plate 27 is supported via hydraulic pressure elements which are provided side by side, transverse to the web 4, at each truss 20; the force output of these elements can be controlled and bring about a desired pressure distribution over the pressing area. The pressure plates 26 and 27 transmit the force exerted by the individual pressure members 19 and 20 evenly to the forming belts 1 and 2 and contain canals in which heating elements are arranged or through which a heating medium is conducted.

Between the opposing sides of the pressure plates 26 and 27 and the forming belts 1 and 2, roller chains 14 are arranged, on which the forming belts 1 and 2 roll relative to the pressure plates 26 and 27 and which revolve continuously in a longitudinal vertical plane around the pressure plates 26 and 27. The returning legs run in channels of the pressure plates 26 and 27. The rolls of the roller chains 14 transmit the pressure as well as the heat of the pressure plates 26 and 27 to the forming belts 1 and 2 and thus to the web 4.

Figure 2:
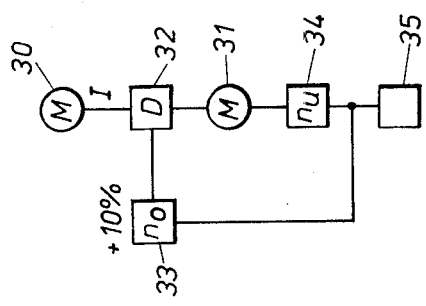
FIG. 2 is a block diagram of the control system.

In the block diagram of FIG. 2, the drive motor of the cylinder 6 for the upper forming belt 1 is indicated as 30 and the drive motor for the cylinder 11 for the lower forming belt 2 as 31. It is understood that the drives 30 and 31 could also act on the cylinders 5 and 12 and that it is also not important whether the drive 30 drives the upper forming belt 1 or the drive 31 the lower forming belt 2.

The torque ratio between the drives 30 and 31 is controlled by the current from the torque controller 32. The ratio between the currents fed to the drives 30 and 31 can be varied by $\pm 10\%$. In the embodiment shown, the setting is chosen so that the current fed to the lower drive 31 is always somewhat larger than that fed to the drive 30, since the lower forming belt 2 is longer, runs through additional stations and therefore has a somewhat higher running resistance.

The lower drive 31 is the lead drive. A speed control 34 is provided therefor, which obtains a desired or reference value input from a set-point speed transmitter 35.

The reference value generated by the transmitter 35 is also fed to the speed control 34 and to the speed control 33 which is assigned to the upper drive 30. Speed control 33 delivers a signal for a speed $n_o$ for the upper drive 30, which is always higher by a certain amount than that delivered by speed control 34. The speed $n_o$ is between 1 and 10% above the speed $n_u$ which is regulated by the speed control 34 for the lower drive 31.

Figure 3:
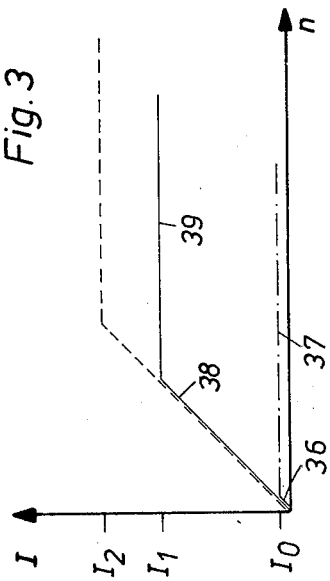
FIG. 3 is a diagram which explains the characteristic of the torque controller.

In FIG. 3, the characteristic of the torque controller 32 is indicated. The torque controller 32 passes only current up to a certain limit which, in turn, is determined by the power consumption of the drive 31, i.e., it is raised if the power consumption of the drive 31 increases.

In the idling condition, the torque controller 32 will pass a certain no-load current $I_o$ which is just sufficient to let the press run without material to be pressed.

When the press is started up, the current at first increases along the curve section 36, then reaches the limit $I_o$ and remains at one and the same level according to the curve section 37 even if the speed increases. However, if there is a load and if the drive 31 draws a larger current, then this current has shifted the passing limit of the torque controller 32 up to the amount $I_1$. The current can therefore increase along the curve branch 38 and then changes into the curve branch 39 located at $I_1$. The amount $I_1$ is chosen so that it is, according to the embodiment shown, somewhat lower than the current consumed by the drive 31, so that the torque delivered by the drive 30 is somewhat smaller if $I_1$ is fed to the latter, just because the upper forming belt 1 requires somewhat less torque. If the current drain in the drive 31 is still larger, the conduction limit of the torque controller 32 is pushed out further to $I_2$, so that the characteristic of the torque controller 32 is given by the dashed line.

If the press is switched on in no-load condition, the speed control 34 first runs the motor 31 up to the set speed $n_u$. The speed control 33 of the upper drive 30 controls the latter to a somewhat higher speed $n_o$; since the power demand is low at no load, the current drawn by the drive 30 is below $I_o$ and is therefore passed by the torque controller 32 in any event.

If the chip cake is now run into the press, the lower speed control 34 wants to maintain the speed $n_u$ and supplies, for this purpose, more current to the drive 31 and therefore, more power. As before, the speed control 33 wants to maintain the higher set speed $n_o$ and increase the current supplied to the drive 30. Since the forming belts 1 and 2 can only advance in the pressing section 3 at the same velocity, a power increase at the drive 30 would lead to the condition where the upper belt 1 also pulls the lower forming belt 2. Thereby, the actual speed value of the latter would exceed the value set at the control 34, so that the control 34 would throttle the power supplied to the drive 31 and the drive power would finally be made available almost exclusively through the upper drive 30.

In order to avoid this, the torque controller 32 has the characteristic shown in FIG. 3. For, it passes current only up to a certain amount which depends on the current or power consumption of the drive 31. The signal of the speed control 33 remains ineffective. The drive 30 does not receive increased current, but only an amount derived from the current of the drive 31 according to the setting of the torque controller 32.

In the load case, the speed control 33 set to the higher speed $n_o$ is therefore made ineffective and the control of the drive 30 is taken over by the torque controller 32.

Limiting the current I at the output of the torque controller 32 to a predetermined value prevents uncontrollable power distributions in the drives 30 and 31. Taking into consideration the different resistances to the advance of the forming belts 1 and 2, the distribution can be made in such a manner that the forming belts 1 and 2 advance in the pressing section 3 with the same velocity, and no shear forces need to be transmitted in the forming belt plane by the chip cake 4'.

What is claimed is:

1. In a control system for a continuously operating press, for the manufacture of chipboard, molded laminated plastic and the like, having two endless revolving forming belts which advance opposite each other in a pressing section, between which a starting material is compressed in the pressing section and each of which belts is provided with a separate drive, one of the drives being a lead drive equipped with a speed control for holding the belt velocity constant, the improvement comprising:
   (a) a torque controller for comparing the torque of the lead drive with the torque of the other drive and providing an output which regulates the torque of the other drive such that the torques of the two drives always retain an adjustable ratio between each other over the entire torque range; and
   (b) a further speed control for the belt drive which is not operating as the lead drive which is set higher than the speed control of the lead drive and which is adapted to be adjusted along with the speed control of the lead drive, with the speed ratio remaining the same.

2. The improvement according to claim 1 wherein said torque controller controls said torques so that they are equal within about ±10%.

3. The improvement according to claim 1 or 2 wherein the speed control of the drive which does not operate as the lead drive, is set 1 to 10% higher than the speed control of the lead drive.

* * * * *